US012776107B2

(12) United States Patent
Jain et al.

(10) Patent No.: US 12,776,107 B2
(45) Date of Patent: Oct. 27, 2026

(54) SYSTEM AND METHOD FOR PROVIDING AN INTERACTION WITH REAL-WORLD OBJECT VIA VIRTUAL SESSION

(71) Applicant: SAMSUNG ELECTRONICS CO., LTD., Suwon-si (KR)

(72) Inventors: Ankit Jain, Delhi (IN); Siba Prasad Samal, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 210 days.

(21) Appl. No.: 18/422,872

(22) Filed: Jan. 25, 2024

(65) Prior Publication Data

US 2024/0249479 A1 Jul. 25, 2024

Related U.S. Application Data

(63) Continuation of application No. PCT/KR2024/001068, filed on Jan. 23, 2024.

(30) Foreign Application Priority Data

Jan. 25, 2023 (IN) ............................ 202341004841

(51) Int. Cl.
*G06T 19/00* (2011.01)
*G06T 19/20* (2011.01)
(Continued)

(52) U.S. Cl.
CPC ............ *G06T 19/006* (2013.01); *G06T 19/20* (2013.01); *G06V 10/44* (2022.01); *G06V 10/764* (2022.01);
(Continued)

(58) Field of Classification Search
None
See application file for complete search history.

(56) References Cited

U.S. PATENT DOCUMENTS 10,191,541 B2 1/2019 Chen
10,380,803 B1 8/2019 Jaafar et al.
(Continued)

FOREIGN PATENT DOCUMENTS

EP 3 599 532 B1 6/2022
WO 2021/102566 A1 6/2021

OTHER PUBLICATIONS

Strange, "Disney experiment lets you catch real objects while in VR," Mar. 20, 2017, Total 4 pages, Retrieved from https://mashable.com/article/vr-catching-real-ball-disney-research.
(Continued)

*Primary Examiner* — Ryan M Gray
(74) *Attorney, Agent, or Firm* — Sughrue Mion, PLLC

(57) ABSTRACT

According to an embodiment of the disclosure, the method may include detecting the at least one real-world object, detecting an occurrence of an event associated with the at least one real-world object in proximity of an user in a real world, predicting at least one user action in the real world subsequent to the occurrence of the event based on a movement of an user in the real world for interacting with the at least one real world object and generating an overlay of the at least one real-world object within the ongoing virtual session based on a position of at least one real world object and a position of the user.

18 Claims, 9 Drawing Sheets

(51) Int. Cl.

| | |
|---|---|
| ***G06V 10/44*** | (2022.01) |
| ***G06V 10/764*** | (2022.01) |
| ***G06V 20/40*** | (2022.01) |
| ***G06V 40/20*** | (2022.01) |

(52) U.S. Cl.
CPC .............. *G06V 20/44* (2022.01); *G06V 40/20* (2022.01); *G06T 2219/2016* (2013.01); *G06V 2201/07* (2022.01)

(56) References Cited

U.S. PATENT DOCUMENTS

| | | | | |
|---|---|---|---|---|
| 10,474,336 | B2 | 11/2019 | Smith | |
| 10,803,663 | B2 * | 10/2020 | Wang | G06F 3/011 |
| 11,158,131 | B1 | 10/2021 | Buzzerio et al. | |
| 11,195,019 | B2 | 12/2021 | Lee et al. | |
| 11,500,452 | B2 | 11/2022 | Pla I. Conesa et al. | |
| 2004/0137911 | A1 | 7/2004 | Hull et al. | |
| 2014/0085298 | A1 * | 3/2014 | Matsui | G06F 30/20 345/419 |
| 2014/0310595 | A1 | 10/2014 | Acharya et al. | |
| 2017/0061696 | A1 * | 3/2017 | Li | G02B 27/017 |
| 2017/0169610 | A1 * | 6/2017 | King | G02B 27/017 |
| 2018/0053351 | A1 | 2/2018 | Anderson | |
| 2018/0095542 | A1 | 4/2018 | Mallinson | |
| 2018/0173323 | A1 * | 6/2018 | Harvey | G06F 3/011 |
| 2019/0235624 | A1 | 8/2019 | Goldberg et al. | |
| 2019/0371028 | A1 | 12/2019 | Harrises et al. | |
| 2020/0026922 | A1 * | 1/2020 | Pekelny | G06V 20/20 |
| 2020/0043210 | A1 * | 2/2020 | Xu | G06T 11/60 |
| 2021/0350630 | A1 | 11/2021 | Petrovskaya et al. | |
| 2022/0232104 | A1 * | 7/2022 | Brimhall | H04L 67/131 |
| 2024/0040086 | A1 * | 2/2024 | Krol | G06T 19/20 |

OTHER PUBLICATIONS

International Search Report dated Apr. 29, 2024, issued by the International Searching Authority in International Application No. PCT/KR2024/001068.

Communication dated Aug. 6, 2025 issued by Intellectual Property India in Indian Patent Application No. 202341004841.

Communication dated Nov. 28, 2025, issued by European Patent Office in European Patent Application No. 24747427.3.

* cited by examiner

SYSTEM AND METHOD FOR PROVIDING AN INTERACTION WITH REAL-WORLD OBJECT VIA VIRTUAL SESSION

CROSS-REFERENCE TO RELATED APPLICATIONS

This application is a bypass continuation of International Application No. PCT/KR2024/001068, filed on Jan. 23, 2024, which is based on and claims priority to Indian patent application Ser. No. 202341004841, filed on Jan. 25, 2023, the disclosures of which are incorporated by reference herein in their entireties.

BACKGROUND

1. Field

The disclosure relates to a virtual environment, and more particularly, to systems and methods for providing user interaction with the real world while the user is immersed in the virtual environment.

2. Description of Related Art

Users have started to replicate their real lives in a virtual environment in different domains like office workspaces, shopping complexes, etc. The virtual environment creates a simulated environment. The virtual environment, e.g., a virtual reality or a virtual session, may provide the user with a three-dimensional (3D) experience. In such a virtual session, instead of viewing a screen, the user may be immersed in and interact with the 3D world. Particularly, in a metaverse which is a form of the virtual session, the user may create a virtual avatar to interact and create a presence in the virtual session that may allow the user to interact with virtual places, other avatars, and other elements of the metaverse. The metaverse may provide an integrated network of 3D virtual worlds. These 3D virtual worlds are accessed through a virtual reality head-mounted display (HMD) or headset. The user may navigate the metaverse using their eye movements, feedback controllers and/or voice commands. The HMD may enable the user to be immersed in the metaverse, stimulating what is known as presence, which is created by generating the physical sensation of actually being in the virtual session.

An immersed user may be a user immersed in an ongoing virtual session, particularly an ongoing metaverse session while wearing the HMD. Thus, it may be possible that the immersed user may be dissociated from a real world, a real-world object(s), and a real-world event(s) occurring in the vicinity of the immersed user. The immersed user may then use guesswork or may apply mind-muscle memory to figure out the real-world object near to them in the real world as the immersed user is only able to view the ongoing virtual session.

For the immersed user, continuing the virtual session while performing tasks in real life may become impossible without removing the HMD or maybe switching to camera mode in an augmented/virtual reality thus infringing the privacy of the immersed user.

Even while the virtual session is ongoing, the immersed user exists in the real world and there may be real-world event(s) which may require the immersed user's attention. However, limitations of the related technologies leave the immersed user with no awareness of the real world.

In some related technologies, the immersed user may receive a text notification or other warning indications in the HMD upon stepping out of a designated play area in the virtual session or upon stepping near the real-world object(s) to avoid a collision. However, the related technologies have failed to replicate the real-world object(s) or the real-world event(s) in real time. Further, the related technologies fail to intelligently identify interactions of the real-world object(s) which may be of interest to the immersed user during the ongoing virtual session. Moreover, the related technologies may not provide any solution to assist or navigate the immersed user to perform the identified real-world interactions of interest to the immersed user.

Thus, there is a need to overcome the above-mentioned difficulties of the related technologies.

SUMMARY

According to an embodiment of the disclosure, the method may include detecting the at least one real-world object. According to an embodiment of the disclosure, the method may include detecting an occurrence of an event associated with the at least one real-world object in proximity of an user in a real world. According to an embodiment of the disclosure, the method may include predicting at least one user action in the real world subsequent to the occurrence of the event based on a movement of an user in the real world for interacting with the at least one real world object. According to an embodiment of the disclosure, the method may include generating an overlay of the at least one real-world object within the ongoing virtual session based on a position of at least one real world object and a position of the user.

According to an embodiment of the disclosure, a virtual reality device may include at least one memory configured to store instructions and at least one processor configured to execute the instructions. According to an embodiment of the disclosure, at least one processor is configured to detect the at least one real-world object. According to an embodiment of the disclosure, at least one processor is configured to detect an occurrence of an event associated with the at least one real-world object in proximity of an user in a real world. According to an embodiment of the disclosure, at least one processor is configured to predict at least one user action in the real-world subsequent to the occurrence of the event based on a user movement in the real world for interacting with the at least one real-world object. According to an embodiment of the disclosure, at least one processor is configured to generate an overlay of the at least one real-world object within the ongoing virtual session based on a position of at least one real world object and a position of the user.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
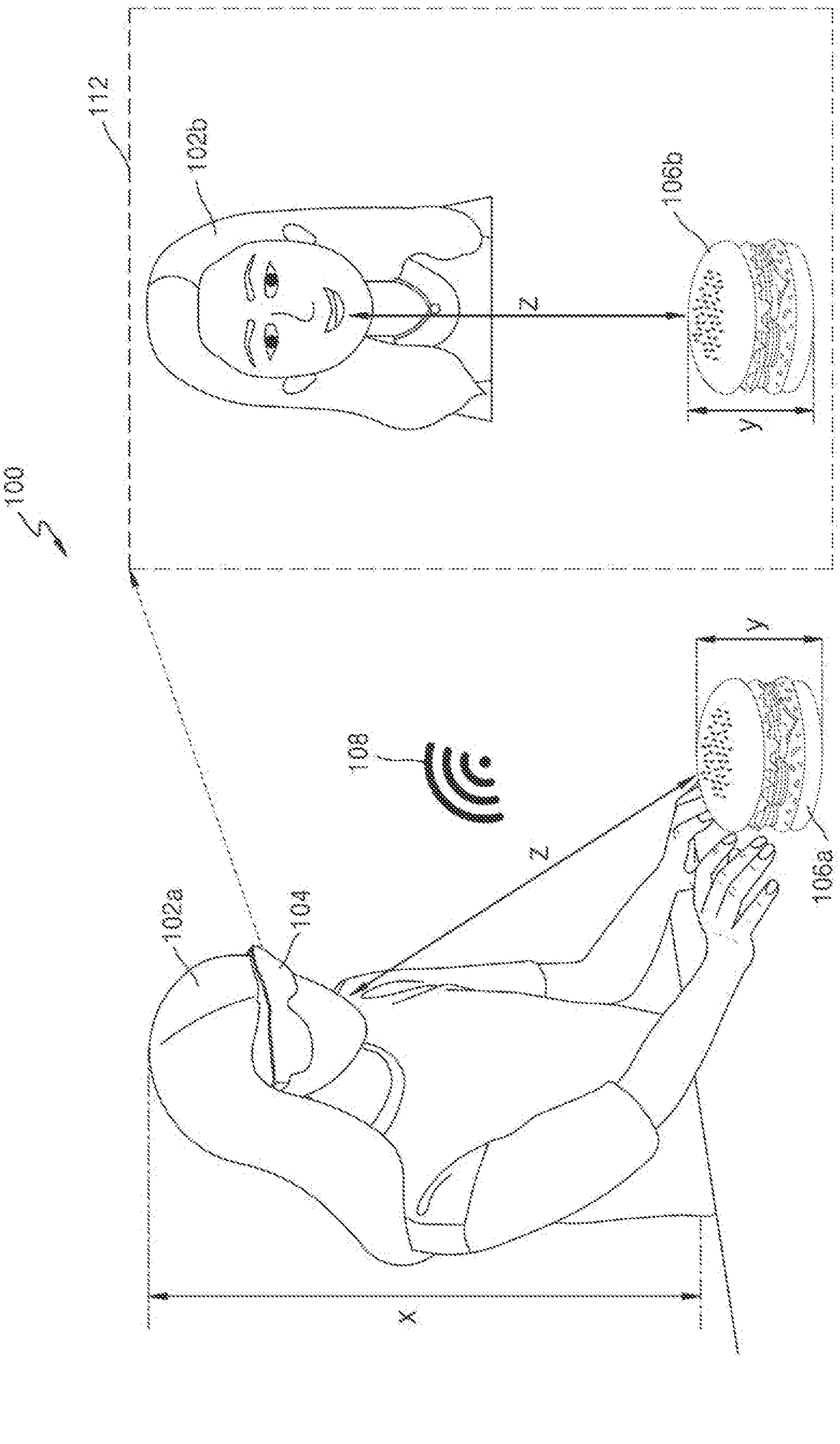
FIG. 1 illustrates a schematic block diagram depicting an environment for the implementation of a system for providing an interaction between a user and a real-world object via an ongoing virtual session, according to an embodiment.

Reference will now be made to the various embodiments and specific language will be used to describe the same. It will nevertheless be understood that no limitation of the scope of the disclosure is thereby intended, such alterations and further modifications in the illustrated system, and such further applications of the principles of the disclosure as illustrated therein being contemplated as would normally occur to one skilled in the art to which the disclosure relates.

Further, skilled artisans will appreciate that elements in the drawings are illustrated for simplicity and may not have necessarily been drawn to scale. For example, the flow charts illustrate the method in terms of the most prominent steps involved to help to improve understanding of aspects of the disclosure. Furthermore, in terms of the construction of the device, one or more components of the device may have been represented in the drawings by conventional symbols, and the drawings may show only those specific details that are pertinent to understanding the embodiments so as not to obscure the drawings with details that will be readily apparent to those of ordinary skill in the art having the benefit of the description herein.

It will be understood by those skilled in the art that the foregoing general description and the following detailed description are explanatory of the disclosure and are not intended to be restrictive thereof.

Reference throughout this specification to "an aspect," "another aspect" or similar language means that a particular feature, structure, or characteristic described in connection with the embodiment is included in at least one embodiment of the disclosure. Thus, appearances of the phrase "in an embodiment", "in another embodiment" and similar language throughout this specification may but do not necessarily, all refer to the same embodiment.

The terms "comprises", "comprising", "includes", "including", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Before undertaking the detailed description below, it may be advantageous to set forth definitions of certain words and phrases used throughout the present disclosure. The term "couple" and the derivatives thereof refer to any direct or indirect communication between two or more elements, whether or not those elements are in physical contact with each other. The terms "transmit", "receive", and "communicate" as well as the derivatives thereof encompass both direct and indirect communication. The terms "include" and "comprise", and the derivatives thereof refer to inclusion without limitation. The term "or" is an inclusive term meaning "and/or". The phrase "associated with," as well as derivatives thereof, refer to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" refers to any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of A, B, and C" includes any of the following combinations: A, B, C, A and B, A and C, B and C, and A and B and C, and any variations thereof. Similarly, the term "set" means one or more. Accordingly, the set of items may be a single item or a collection of two or more items.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as Read Only Memory (ROM), Random Access Memory (RAM), a hard disk drive, a Compact Disc (CD), a Digital Video Disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

The terms like "virtual session", "virtual environment", "virtual world" or "virtual space" may be used interchangeably throughout the description.

The disclosure is directed towards an Ultra-wideband (UWB) based system and method for providing an interaction to a user interacting with a real-world object while the user is immersed in an ongoing virtual session. The technique for the disclosure includes generating an overlay of the real-world object within the ongoing virtual session. The overlay resembles the position of the real-world object in the ongoing virtual session, particularly a metaverse session. Further, the overlay synchronizes with the real-world object and provides the immersed user with a virtual interaction. Thus, the virtual interaction with the generated overlay of the real-world object may assist the immersed user in performing a user action in the real world.

The generated overlay synchronizes with the real-world object and enhances the user experience of the virtual session as the immersed user may not have to exit the virtual session or remove a virtual session device for interacting with the real-world object.

According to an aspect of the disclosure, there is provided a method for providing an interaction with at least one real-world object via an ongoing virtual session including: identifying the at least one real-world object; identifying an occurrence of an event associated with the at least one real-world object in proximity of a user in a real world that is in the ongoing virtual session; based on a user movement in the real world for interacting with the at least one real-world object, predicting at least one user action in the real world subsequent to the occurrence of the event; identifying a position of the user in the real world and a position of the at least one real-world object with reference to the position of the user; generating an overlay of the at least one real-world object within the ongoing virtual session, such that the overlay identifies the position of the at least one real-world object; and providing the user with at least one virtual interaction associated with the generated overlay of the at least one real-world object, wherein the at least one virtual interaction assists the user in performing the predicted at least one user action in the real world.

The identifying the at least one real-world object may include: transmitting a first signal in the proximity of the user; receiving a second signal reflected from the at least one real-world object; identifying a variation in the second signal, the variation corresponding to a presence of at least one real-world object; and identifying the at least one real-world object based on the variation.

The identifying the at least one real-world object further may include: identifying a shape of the at least one real-world object based on the identified variation; identifying at least one user parameter including at least one of a location, a time, or a previous activity; and identifying the at least one real-world object in the real world based on the shape and the at least one user parameter.

The first signal may be transmitted and the second signal may be received via an ultra-wide band (UWB) radar.

The identifying the occurrence of the event in proximity of the user may include: identifying a positional coordinate of the at least one real-world object based on the second signal; identifying a spatial transformation in the at least one real-world object based on the positional coordinate, wherein the spatial transformation corresponds to at least one of a change in shape or a change in the positional coordinate; and identifying the occurrence of the event in the real world based on the spatial transformation.

The predicting the at least one user action in the real world subsequent to the occurrence of the event may include: identifying a correlation between the identified event and the identified at least one real-world object associated with the event; and predicting the at least one user action in the real world based on the correlation.

The method may further include identifying an action parameter indicative of a duration of the at least one user action, a classification of the at least one user action based on the identified correlation; and identifying a privacy level of the at least one user action, wherein the privacy level corresponds to display restrictions on the at least one user action and the associated at least one real-world object for another user.

The generating the overlay of the at least one real-world object within the ongoing virtual session may include: receiving a spatial coordinate of the least one real-world object, wherein the spatial coordinate corresponds to vertices of the at least one real-world object in the real world; identifying a characteristic feature of the ongoing virtual session, wherein the characteristic feature corresponds to a digital environment of the ongoing virtual session; associating the spatial coordinate with the characteristic feature; and generating the overlay of the at least one real-world object within the ongoing virtual session based on the associated spatial coordinate.

The method may further include identifying a scaling and position coordinates for the overlay based on the at least one real-world object, wherein the scaling corresponds to a proportional dimension of the overlay with reference to the at least one real-world object.

The providing the user with the at least one virtual interaction associated with the generated overlay of the at least one real-world object may include: identifying a virtual coordinate of the overlay in the ongoing virtual session based on spatial coordinates of the least one real-world object, wherein the virtual coordinate corresponds to a space to overlay the real-world object into the ongoing virtual session; receiving at least one user parameter affecting the overlay based on the at least one user action; identifying the at least one virtual interaction associated with the generated overlay from a pre-defined virtual interaction table based on the virtual coordinate and the at least one user parameter; and providing the at least one virtual interaction in the ongoing virtual session based on selection.

According to an aspect of the disclosure, there is provided an ultra-wide-band (UWB) based method for interacting with at least one real-world object within an ongoing virtual session including: identifying a user context corresponding to at least one of a user current location, a time, or an environment in the real world, wherein a user is in the ongoing virtual session; identifying at least one real-world object; identifying at least one real-world event associated with the at least one real-world object in a proximity of the user; identifying at least one user action associated with the at least one real-world object, based on correlating the user context with the at least one real-world event; and generating, at least one virtual interaction in the ongoing virtual session based on the identified user action, wherein the at least one virtual interaction assists the user in performing the at least one user action in the real world.

According to an aspect of the disclosure, there is provided a system for providing an interaction with at least one real-world object via an ongoing virtual session including: at least one memory configured to store instructions; at least one processor configured to execute the instructions to: identify the at least one real-world object; identify an occurrence of an event associated with the at least one real-world object, in proximity of a user in a real world that is in the ongoing virtual session; based on a user movement in the real world for interacting with the at least one real-world object, predict at least one user action in the real-world subsequent to the occurrence of the event; identify a position of the user in the real world and a position of the at least one real-world object with reference to the position of the user; generate an overlay of the at least one real-world object within the ongoing virtual session, such that the overlay identifies the position of the at least one real-world object; and provide the user with at least one virtual interaction associated with the generated overlay of the at least one real-world object, wherein the at least one virtual interaction assists the user in performing the predicted at least one user action in the real world.

The system may further include an ultra-wideband (UWB) radar in communication with the at least one processor, the UWB radar being configured to: transmit a first signal in the proximity of the user; receive a second signal reflected from the at least one real-world object; wherein the at least one processor may be further configured to execute the instructions to: identify a variation in the second signal, the variation corresponding to a presence of at least one real-world object; and identify the at least one real-world object based on the variation.

The at least one processor may be further configured to execute the instructions to: identify a shape of the at least one real-world object based on the identified variation; identify at least one user parameter including at least one of a location, a time, or a previous activity; and identify the at least one real-world object in the real world based on the shape and the at least one user parameter.

The at least one processor may be further configured to execute the instructions to: identify a positional coordinate of the at least one real-world object based on the second signal; identify a spatial transformation in the at least one real-world object based on the positional coordinate, wherein the spatial transformation corresponds to at least one of a change in shape or a change in the positional coordinate; and identify the occurrence of the event in the real world based on the spatial transformation.

The at least one processor may be further configured to execute the instructions to: identify a correlation between the identified event and the identified at least one real-world object associated with the event; and predict the at least one user action in the real world based on the correlation.

The at least one processor may be further configured to execute the instructions to: identify an action parameter indicative of a duration of the at least one user action, a classification of the at least one user action based on the identified correlation; and identify a privacy level of the at least one user action, wherein the privacy level corresponds to a display restrictions on the at least one user action and the associated at least one real-world object for another user.

The at least one processor may be further configured to execute the instructions to: receive a spatial coordinate of the least one real-world object, wherein the spatial coordinate corresponds to vertices of the at least one real-world object in the real world; identify a characteristic feature of the ongoing virtual session, wherein the characteristic feature corresponds to a digital environment of the ongoing virtual session; associate the spatial coordinate with the characteristic feature; and generate the overlay of the at least one real-world object within the ongoing virtual session based on the associated spatial coordinate.

The at least one processor may be further configured to execute the instructions to: identify a scaling and a position coordinates for the overlay based on the at least one real-world object, wherein the scaling corresponds to a proportional dimension of the overlay with reference to the at least one real-world object.

The at least one processor may be further configured to execute the instructions to: identify a virtual coordinate of the overlay in the ongoing virtual session based on spatial coordinates of the least one real-world object, wherein the virtual coordinate corresponds to a space to overlay the real-world object into the ongoing virtual session; receive at least one user parameter affecting the overlay based on the at least one user action; identify the at least one virtual interaction associated with the generated overlay from a pre-defined virtual interaction table based on the virtual coordinate and the at least one user parameter; and provide the at least one virtual interaction in the ongoing virtual session based on selection.

According to an aspect of the disclosure, there is provided an ultra-wideband (UWB) based system for interacting with at least one real-world object within an ongoing virtual session includes: at least one memory configured to store instructions; at least one processor configured to execute the instructions to: identify, a user context indicative of at least one of a user current location, a time, an environment in the real world, wherein a user is immersed in the ongoing virtual session; identify at least one real-world object; identify at least one real-world event associated with the at least one real-world object in vicinity of the user; identify at least one user action associated with the at least one real-world object, based on correlating the user context with the at least one real-world event; and generate at least one virtual interaction in the ongoing virtual session based on the identified user action, wherein the at least one virtual interaction assists the user in performing the at least one user action in the real world.

FIG. 1 illustrates a schematic block diagram depicting an environment for the implementation of a system 100 for providing the interaction between the user 102*a* and the real-world object 106*a* via the ongoing virtual session 112, according to an embodiment of the disclosure. The user 102*a* is immersed in the ongoing virtual session 112 and may be interchangeably referred to as the immersed user 102*a* upon immersion in the ongoing virtual session 112. The immersed user 102*a* may be wearing a virtual session device 104 on the forehead to immerse in the ongoing virtual session 112. In an example, the ongoing virtual session 112 may be a metaverse session. In the example, the virtual session device 104 may be configured to provide a virtual reality experience to the immersed user 102*a* and/or to generate the ongoing virtual session 112.

In an embodiment, the virtual session device 104 may include, but is not limited to, a tablet PC, a Personal Digital Assistant (PDA), a mobile device, a palmtop computer, a laptop computer, a desktop computer, a server, a cloud server, a remote server, a communications device, a head-mounted display (HMD), a virtual reality glasses, any other smart device configured to generate and provide a virtual environment to the user as discussed throughout this disclosure or any other machine controllable through the wireless-network and capable of executing a set of instructions (sequential or otherwise) that specify actions to be taken by that machine. In an embodiment, the system 100 may be included within the virtual session device 104. In another embodiment, the system 100 may be configured to operate as a standalone device or a system based in a server/cloud architecture communicably coupled to the virtual session device 104.

An avatar 102*b* of the immersed user 102*a* is produced in the ongoing virtual session 112. The avatar 102*b* of the immersed user 102*a* in the ongoing virtual session 112, is shown in FIG. 1. The avatar 102*b* may be defined as a virtual appearance of the immersed user 102*a* in the ongoing virtual session 112. The avatar 102*b* may be automatically generated based on a plurality of pre-defined attributes or may be generated based on user-defined attributes. The attributes corresponding to the avatar 102*b* may include, but are not limited to, hair, color, eyes, lips, height, dress, gender and so forth.

In an embodiment, while the immersed user 102*a* is interacting in the ongoing virtual session 112, it may be possible that the immersed user 102*a* may be required to interact with the real-world object 106*a*. For example, the immersed user 102*a* is seated in a cafeteria and a real-world event occurs say, food is served to the immersed user 102*a*. In the example, food is the real-world object 106*a* with which the immersed user 102*a* would like to interact while continuing the ongoing virtual session 112.

In an embodiment, the system 100 may include an Ultra-wideband (UWB) radar 108 may be present in the vicinity of the immersed user 102*a*. In an example, the ultra-wideband radar 108 may be residing in the virtual session device 104. Thus, the ultra-wideband radar 108 and the virtual session device 104 may be in communication with each other. The UWB radar 108 may be configured to transmit a UWB signal in the vicinity of the immersed user 102*a* for detecting the real-world object 106*a* and subsequently the event in the real world associated with the real-world object 106*a*. Thus, the real-world object 106*a* and the event associated with the real-world object 106*a* are detected.

In an embodiment, the system 100 may determine a shape, a positional coordinate of the real-world object 106*a* via the UWB signals. Further, the system 100 may determine a user parameter such as a location, a time, a previous activity and thus detect the real-world object 106*a* based on the shape and the user parameter.

Further, a user action in the real world after the occurrence of the event in the real world is predicted. The user action is indicative of the interaction between the immersed user 102*a* and the real-world object 106*a*.

Now based on the detection of the real-world object 106*a* the overlay 106*b* for the real-world object 106*a* is generated in the ongoing virtual session 112. The overlay 106*b* may resemble the position of the real-world object 106*a* and may also synchronize with the real-world object 106*a*. Consequently, attributes of the overlay 106*b* may resemble the real-world object 106*a* and the avatar 102*b* may be able to perform a virtual interaction with the overlay 106*b*.

As the immersed user 102*a* performs the interaction with the real-world object 106*a*, the user action is predicted in the ongoing virtual session 112. The user action thus predicted matches the interaction of the immersed user 102*a* with the real-world object 106*a*. As a result, the avatar 102*b* performs the virtual interaction with the overlay 106*b* in the ongoing virtual session 112 which may be similar to the interaction of the immersed user 102*a* with the real-world object 106*a*. Therefore, the disclosure may assist the immersed user 102*a* in performing the user action in the real world without a need to remove the virtual session device 104 or without exiting from the ongoing virtual session 112.

Figure 2:
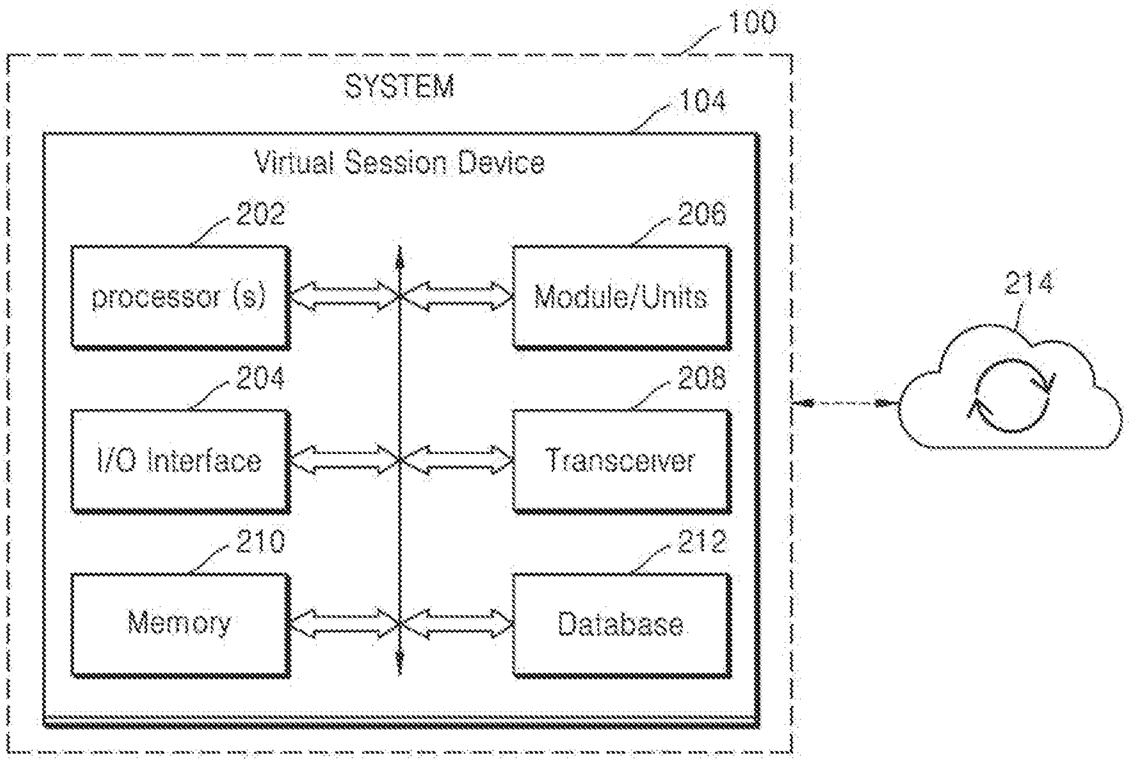
FIG. 2 illustrates an architecture of the system for providing the interaction with the real-world object via the ongoing virtual session, according to an embodiment.

FIG. 2 illustrates a general architecture of the system 100 for providing the interaction with the real-world object 106*a* via the ongoing virtual session 112, according to an embodiment of the disclosure. According to an embodiment, the system 100 includes one or more processors 202, an I/O interface 204, one or more modules/units 206, a transceiver 208, a memory 210 and a database 212.

In an embodiment, the processor/controller 202 may be operatively coupled to each of the I/O interface 204, the modules 206, the transceiver 208, the memory 210 and the database 212. In one embodiment, the processor/controller 202 may include at least one data processor for executing processes in Virtual Storage Area Network. In another embodiment, the processor/controller 202 may include specialized processing units such as integrated system (bus) controllers, memory management control units, floating point units, graphics processing units, digital signal processing units, etc. In one embodiment, the processor/controller 202 may include a central processing unit (CPU), a graphics processing unit (GPU), or both. In another embodiment, the processor/controller 202 may be one or more general processors, digital signal processors, application-specific integrated circuits, field-programmable gate arrays, servers, networks, digital circuits, analog circuits, combinations thereof, or other now-known or later developed devices for analyzing and processing data. The processor/controller 202 may execute a software program, such as code generated manually (i.e., programmed) to perform the desired operation.

The processor/controller 202 may be disposed in communication with one or more input/output (I/O) devices via the I/O interface 204. The I/O interface 204 may employ communication code-division multiple access (CDMA), high-speed packet access (HSPA+), global system for mobile communications (GSM), long-term evolution (LTE), WiMax, or the like, etc.

Using the I/O interface 204, the system 100 may communicate with one or more I/O devices, specifically, the virtual session device 104 configured to generate and provide the virtual session 112 to the user 102*a*. For example, the input device may be an antenna, microphone, touch screen, touchpad, storage device, transceiver, video device/source, etc. The output devices may be a printer, fax machine, video display (e.g., cathode ray tube (CRT), liquid crystal display (LCD), light-emitting diode (LED), plasma, Plasma Display Panel (PDP), Organic light-emitting diode display (OLED) or the like), audio speaker, etc. In an embodiment, the system 100 may communicate with the virtual session device 104 associated with the user 102*a* using the I/O interface 204.

The processor/controller 202 may be disposed in communication with a network 214 via a network interface (not shown). In an embodiment, the network interface may be the I/O interface 204. The network interface may connect to the network to enable connection of the system 100 with the outside environment and/or device/system. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network may include, without limitation, a direct interconnection, local area network (LAN), wide area network (WAN), wireless network (e.g., using Wireless Application Protocol), the Internet, etc. Using the network interface and the communication network, the voice assistant device 200 may communicate with other devices. The network interface 212 may employ connection protocols including, but not limited to, direct connect, Ethernet (e.g., twisted pair 10/100/1000 Base T), transmission control protocol/internet protocol (TCP/IP), token ring, IEEE 802.11a/b/g/n/x, etc.

In an embodiment, the processor/controller 202 may be configured to extract one or more environment-related parameters from the ongoing virtual session 112. The environment-related parameters may include information such as, but not limited to, a location of the avatar 102*b*, an action of the avatar 102*b*, an emotion of the avatar 102*b*, a field of the view of the avatar 102*b*, and user interaction profile(s), in the ongoing virtual session 112. The location of the avatar

102*b* may include places such as, but not limited to, shopping mall(s), park(s), gaming arena(s) and so forth. The action of avatar 102*b* may include activities such as, but not limited to, playing, relaxing, walking, shopping, fighting and so forth. The field of view of the avatar 102*b* may include scene information which is currently presented to the immersed user 102*a* and/or the associated avatar 102*b*. The user interaction profile may include information such as, but not limited to, user friends in the ongoing virtual session 112, user interacted objects in the ongoing virtual session 112, user selected clothes in the ongoing virtual session 112 or any other information which may indicate user interaction and/or interest in the ongoing virtual session 112.

In an embodiment, the controller/processor 202 may be configured to detect the real-world object 106*a* in the vicinity of the immersed user 102*a*. The system 100 may include the UWB radar 108. The controller/processor 202 may be in communication with the UWB radar 108. The UWB radar 108 may be configured to transmit a first signal in the proximity of the immersed user 102*a*. Further, the UWB radar 108 may receive a second signal. The second signal is reflected from the real-world object 106*a*. The controller/processor 202 is configured to determine a variation in the second signal such that the variation is indicative of the presence of the real-world object 106*a* and thus detects the presence of the real-world object 106*a* based on the variation in the second signal.

Further, the controller/processor 202 may be configured to determine the shape of the real-world object 106*a* based on the determined variation in the second signal. The controller/processor 202 may determine the user parameter. In an example, the user parameter may include one of the location, time, and the previous activity of the immersed user 102*a* and detect the real-world object 106*a* in the real world based on the shape and the user parameter.

The controller/processor 202 may be configured to detect an occurrence of an event associated with the real-world object 106*a*. The event occurs in the real world in the proximity of the immersed user 102*a*. The controller/processor 202 may be configured to determine the positional coordinate of the real-world object 106*a* based on the second signal. Further, the controller/processor 202 may determine a spatial transformation in the real-world object 106*a* based on the positional coordinate. In an example, the spatial transformation is indicative of a change in shape, and/or a change in the positional coordinate of the real-world object 106*a*. Thus, controller/processor 202 may be configured to detect the occurrence of the event in the real world based on the spatial transformation.

The controller/processor 202 may be configured to predict the user action in the real world subsequent to the occurrence of the event. In an example, the user action is predicted based on a user movement by the user 102*a* in the real world. The user movement is indicative of actions for performing the interaction with the real-world object 106*a*. In an example, the system 100 may include a pre-defined table stored in the database 212. The pre-defined table may include a classification of the real-world objects, their associated events and their associated user movement. Thus, the controller/processor 202 may be configured to determine a correlation between the detected event and the real-world object 106*a* associated with the event based on the pre-defined table. The controller/processor 202 may then be able to predict the user action in the real world based on the correlation derived from the pre-defined table.

The controller/processor 202 may be configured to determine an action parameter. In an example, the action parameter is indicative of a duration of the user action, and/or a classification of the user action based on the determined correlation. Further, the controller/processor 202 may be configured to determine a privacy level of the user action, wherein the privacy level is indicative of a display restrictions on the user action and the associated the real-world object 106*a* for another user present in the ongoing virtual session 112.

The controller/processor 202 may be configured to determine the position of the immersed user 102*a* in the real world and the position of the real-world object 106*a* with reference to the position of the immersed user 102*a*.

The controller/processor 202 may be configured to generate the overlay 106*b* of the real-world object 106*a* within the ongoing virtual session 112, such that the overlay 106*b* resembles the position of the real-world object 106*a*. In an example, the controller/processor 202 may be configured to receive a spatial coordinate of the real-world object 106*a*. In an example, the spatial coordinate is indicative of vertices of the real-world object 106*a* in the real world. Further, the controller/processor 202 may be configured to identify a characteristic feature of the ongoing virtual session 112. In an example, the characteristic feature is indicative of a digital environment of the ongoing virtual session 112 and associate the spatial coordinate with the characteristic feature. Thus, the controller/processor 202 may be configured to generate the overlay 106*b* of the real-world object 106*a* within the ongoing virtual session 112 based on the association. In an example, the controller/processor 202 may be configured to determine a scaling and a position coordinates for the overlay of the real-world object 106*a*. The scaling is indicative of a proportional dimension of the overlay 106*b* with reference to the real-world object 106*a*.

The processor/controller 202 may be configured to provide the immersed user 102*a* with the virtual interaction associated with the generated overlay 106*b*. The virtual interaction assists the immersed user 102*a* in performing the predicted user action in the real world. In an example, the processor/controller 202 may be configured to determine a virtual coordinate(s) in the ongoing virtual session 112 based on the spatial coordinates of the real-world object 106*a*. The virtual coordinate is indicative of a space to overlay the real-world object 106*a* into the ongoing virtual session 112. The processor/controller 202 may be configured to determine a parameter of the user action affecting the overlay based on the user action. Further, the virtual interaction associated with the generated overlay is selected from a pre-defined virtual coordinate table stored in the database 212 based on the virtual coordinates and the parameters. The pre-defined virtual coordinate table may include classification and/or association of the virtual interaction and the real-world objects. As a result, the pre-defined virtual coordinate table may provide a library of probable virtual interactions for the detected real-world object 106*a* and the subsequent generated overlay 106*b*. Thus, the processor/controller 202 may be configured to provide the virtual interaction in the ongoing virtual session 112 based on selection.

In some embodiments, the memory 210 may be communicatively coupled to the at least one processor/controller 202. The memory 210 may be configured to store data, and instructions executable by the at least one processor/controller 202. In one embodiment, the memory 210 may communicate via a bus within the system 200. The memory 210 may include, but is not limited to, a non-transitory computer-readable storage media, such as various types of volatile and non-volatile storage media including, but not limited to, random access memory, read-only memory, programmable read-only memory, electrically programmable read-only memory, electrically erasable read-only memory, flash memory, magnetic tape or disk, optical media and the like. In one example, the memory 210 may include a cache or random-access memory for the processor/controller 202. In alternative examples, the memory 210 is separate from the processor/controller 202, such as a cache memory of a processor, the system memory, or other memory. The memory 210 may be an external storage device or database for storing data. The memory 210 may be operable to store instructions executable by the processor/controller 202. The functions, acts or tasks illustrated in the figures or described may be performed by the programmed processor/controller 202 for executing the instructions stored in the memory 210. The functions, acts or tasks are independent of the particular type of instruction set, storage media, processor or processing strategy and may be performed by software, hardware, integrated circuits, firmware, micro-code and the like, operating alone or in combination. Likewise, processing strategies may include multiprocessing, multitasking, parallel processing, and the like.

In some embodiments, the modules 206 may be included within the memory 210. The memory 210 may also further include the database 212 to store the pre-defined tables, data. The one or more modules 206 may include a set of instructions that may be executed to cause the system 100 to perform any one or more of the methods/processes disclosed herein. The one or more modules 206 may be configured to perform the steps of the present disclosure using the data stored in a database within the memory 210, for providing the interaction to the immersed user 102*a* with the real-world object 106*a* via the ongoing virtual session 112.

In an embodiment, each of the one or more modules 206 may be a hardware unit which may be outside the memory 210. Further, the memory 210 may include an operating system for performing one or more tasks of the system 100, as performed by a generic operating system in the communications domain. The transceiver 208 may be configured to receive and/or transmit signals to and from the virtual session device 104 associated with the immersed user 102*a*. In one embodiment, the database may be configured to store the information as required by the one or more modules 206 and the processor/controller 202 to perform one or more functions for providing the interaction to the immersed user 102*a* with the real-world object 106*a* via the ongoing virtual session 112.

In an embodiment, the I/O interface 204 may enable input and output to and from the system 100 using suitable devices such as, but not limited to, display, keyboard, mouse, touch screen, microphone, speaker and so forth.

Further, the disclosure contemplates a computer-readable medium that includes instructions or receives and executes instructions responsive to a propagated signal. Further, the instructions may be transmitted or received over the network via a communication port or interface or using a bus (not shown). The communication port or interface may be a part of the processor/controller 202 or may be a separate component. The communication port may be created in software or may be a physical connection in hardware. The communication port may be configured to connect with a network, external media, the display, or any other components in the system 100, or combinations thereof. The connection with the network may be a physical connection, such as a wired Ethernet connection or may be established wirelessly. Likewise, the additional connections with other components of the system 100 may be physical or may be established wirelessly. The network may alternatively be directly connected to the bus. For the sake of brevity, the architecture and standard operations of the operating system, the memory 210, the database, the processor/controller 202, the transceiver 208, and the I/O interface 204 are not discussed in detail.

In an embodiment, the processor/controller 202 may implement various techniques such as, but not limited to, Natural Language Processing (NLP), data extraction, Artificial Intelligence (AI), and so forth to achieve the desired objective. The system 100 may include the modules/engines/units 206 implemented with an AI module that may include a plurality of neural network layers. Examples of neural networks include, but are not limited to, convolutional neural network (CNN), deep neural network (DNN), recurrent neural network (RNN), and Restricted Boltzmann Machine (RBM). The learning technique is a method for training a predetermined target device (for example, a robot, or the unified server) using a plurality of learning data to cause, allow, or control the target device to make a determination or prediction. Examples of learning techniques include, but are not limited to, supervised learning, unsupervised learning, semi-supervised learning, or reinforcement learning. At least one of a plurality of CNN, DNN, RNN, RMB models and the like may be implemented to thereby achieve execution of the present subject matter's mechanism through an AI model. A function associated with AI may be performed through the non-volatile memory, the volatile memory, and the processor 202. The processor 202 may include one or a plurality of processors. At this time, one or a plurality of processors may be a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). One or a plurality of processors control the processing of the input data in accordance with a predefined operating rule or artificial intelligence (AI) model stored in the non-volatile memory and the volatile memory. The predefined operating rule or artificial intelligence model is provided through training or learning. The processor/controller 202 may execute a set of instructions on the performed operations explained above.

Further, a detailed explanation of various functions of the system 100 and/or the processor/controller 202 may be explained in view of FIGS. 3-8.

Figure 3:
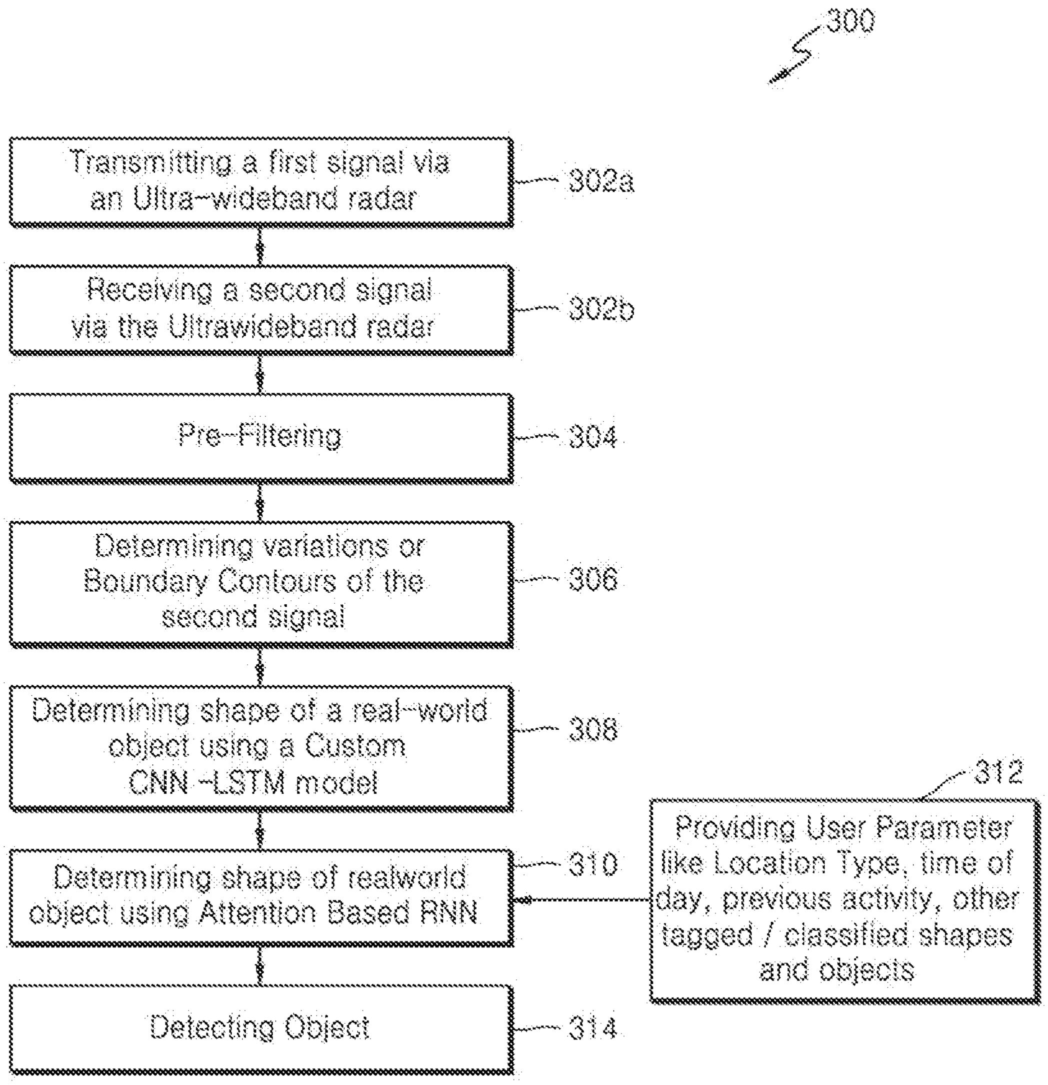
FIG. 3 illustrates a process flow of a method for detecting the real-world object, according to an embodiment.

FIG. 3 illustrates a process flow of a method 300 for detecting the real-world object 106*a* in the real world, according to an embodiment of the disclosure.

In an embodiment, at step 302*a*, the method 300 may include transmitting the first signal via the UWB radar 108 in the proximity of the immersed user 102*a*. Further, at step 302*b*, the method 300 may include receiving the second signal via the UWB radar 108. In an example, the second signal is reflected version of the first signal, reflected from the real-world object 106 present in the proximity of the immersed user 102*a*.

In an example, the first signal may be the UWB signal which may be transmitted in the vicinity spatial space of the UWB radar 108. The first signal after reflecting and passing through various stationary and moving objects scattered signals may be received by the UWB radar 108 representing the second signal. In the example, the second signal may have various properties such as received signal strength (RSS), Time of arrival (ToA), Angle of arrival (AoA) and alike. Even minute variations of movement may be tracked and the object's unique physical properties such as but not limited to, length, width, distance, gap may be identified. Such physical features are unique to an object/person and hence a classification type can be tagged with uniquely identifiable items/objects/persons.

At step 304, the method 300 may include pre-filtration of the second signal. In an example, the second signal may be received in form a waveform. Further, historic raw data may be used to remove noise and clutter from the second signal.

At step 306, the method 300 may include determining the variations in the second signal. In an example, the variations are represented by contours formed in the waveform. In the example, every object may have unique waveforms and thus the second signal may be distinctive for every object.

At step 308, the method 300 may include passing the second signal to a CNN-LSTM model for determining the shape of the real-world object 106*a* in the proximity of the immersed user 102*a* based on the variations. Further, the positional coordinate is also determined based on the second signal. In an example, the positional coordinate is indicative of a list of scalars that act as a label for the position.

At step 310, the method 300 may include passing the second signal to an attention-based RNN model to determine the shape of the real-world object 106*a*.

In continuation with step 310, at step 312, the user parameter such as but not limited to location, time, and previous activity associated with the immersed user 102*a* may be provided to the attention-based RNN model to determine the shape of the real-world object 106*a*.

In continuation with step 310, at step 314, the method 300 may include detecting the real-world object 106*a* as a resultant output of the attention-based RNN model.

Figure 4:
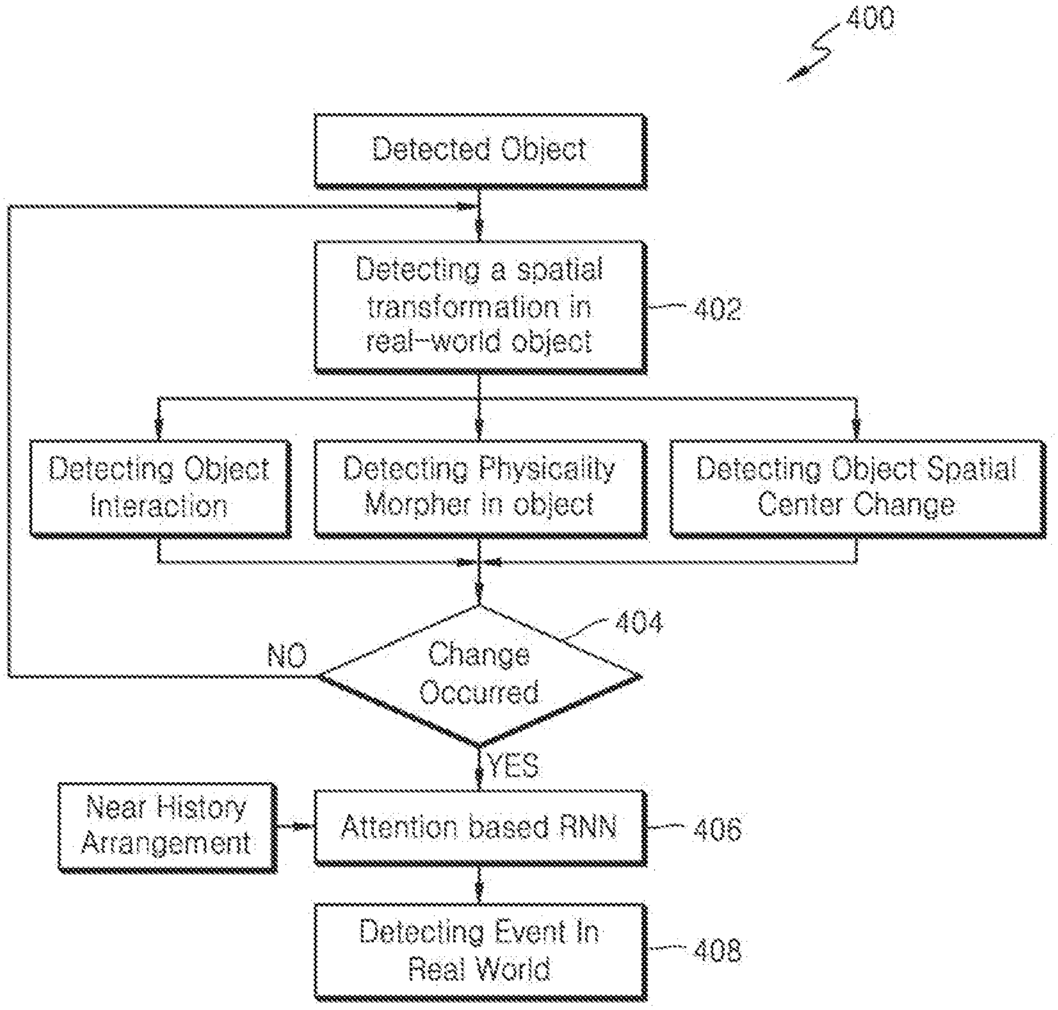
FIG. 4 illustrates a process flow of a method for detecting the event in the real world, according to an embodiment.

FIG. 4 illustrates a process flow 400 of a method for detecting the event in the real world, according to an embodiment of the disclosure.

In an embodiment, in continuation with detecting the real-world object 106*a* as mentioned in FIG. 3, the event associated with the real-world object 106*a* occurring in the proximity of the immersed user 102*a* in the real world is detected.

At step 402, the method 400 may include detecting the spatial transformation in the detected real-world object 106*a*. In an example, the spatial transformation is indicative of but not limited to a change in shape of the detected real-world object 106*a*, a change in the positional coordinate the detected real-world object 106*a*, and/or an interaction of the detected real-world object 106*a* with any other object in the vicinity. In the example, the spatial transformation may be determined by continuously analyzing the second signal received from the UWB radar 108.

Further, at step 404, the method 400 may include determining if the spatial transformation is present in the detected real-world object 106*a*.

In continuation with step 404, if the spatial transformation has occurred and is determined then at step 406, the method 400 may include feeding the spatial transformation along with historical spatial transformation data to the attention-based RNN.

At step 406, the method 400 may include the attention-based RNN providing the detected event that occurred in the real world as output.

At step 408, the method may include detecting an event in the real world.

Figure 5:
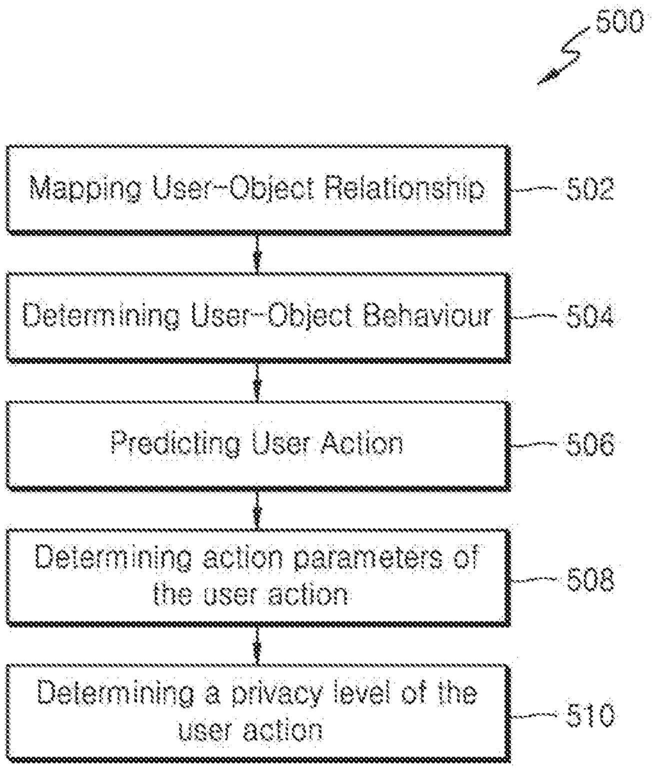
FIG. 5 illustrates a process flow of a method for determining a user action and a privacy level of the user action in the ongoing virtual session, according to an embodiment.

FIG. 5 illustrates a process flow of a method 500 for determining the user action and the privacy level of the user action in the ongoing virtual session 112, according to an embodiment of the disclosure.

In an embodiment, at step 502, the method 500 may include determining the correlation between the detected real-world object 106*a* and the associated event. The correlation may include mapping possible relationships that the immersed user 102*a* may have with the detected real-world object 106*a* and associated event that occurred in the real world. For example, the event may be detected as an item being served or presented in front of the immersed user 102*a*. In the example, the item being the real-world object 106*a* is detected as food item and associated event is detected as serving of the food item. Thus, the association or correlation between the detected event and the detected real-world object 106*a* connected with the event is determined. The correlation between the detected event and the detected real-world object 106*a* may be determined with the pre-defined table. The pre-defined table may include, but not limited to, a database, an array of listed events and real-world objects, any dataset to train neural network for determining the correlation between the detected event and the detected real-world object 106*a*. The pre-defined table may include the classification of the real-world object 106*a*, associated event and associated user movement. Thus, the pre-defined table may provide an input for determining the correlation between the detected event and the detected real-world object 106*a* associated with the event. At step 504, the method 500 may include determining a change in a behavior of the immersed user 102*a* upon detecting the real-world object 106*a* and the associated event that occurred in the real world. In an example, the behavior may be indicative of sudden reactions, movement of the immersed user 102*a* towards the real-world object 106*a* and the associated event.

At step 506, the method 500 may include predicting the user action in the real world. In an example, the correlation and the determined change in the behavior of the immersed user 102*a* upon detecting the real-world object 106*a* and the associated event that occurred in the real world predicts the user action.

At step 508, the method 500 may include determining the action parameter of the user action. In an example, the action parameter may be indicative of the duration of the user action, a classification of the user action. In an example, the pre-defined table may also include the action parameter corresponding to the detected real-world object 106*a*. Thus, once the real-world object 106*a* is detected, the action parameters may be derived via the pre-defined table. In the example, the duration of the user action may indicate the amount of time the immersed user 102*a* may spend interacting with the real-world object 106*a*. In the example, the classification of the user action may indicate the interest level and the importance of the real-world object 106*a*. In the example, if the real-world object 106*a* represents a food item then the user action may be equivalent to consuming the food item. Further, it may lead to the action parameters such as a high-priority classification and suitable time duration to finish the food item. Therefore, the action parameters may be dependent on the user action and the pre-defined table.

At step 510, the method 500 may include determining the privacy level of the user action. The privacy level is indicative of the display restriction on the user action and the detected real-world object 106*a* such that other avatars or users present in the ongoing virtual session 112 may not be able to view the virtual interaction between the avatar 102*b* and the overlay 106*b*. In an example, the privacy level of the user action may be derived from the pre-defined table.

Figure 6:
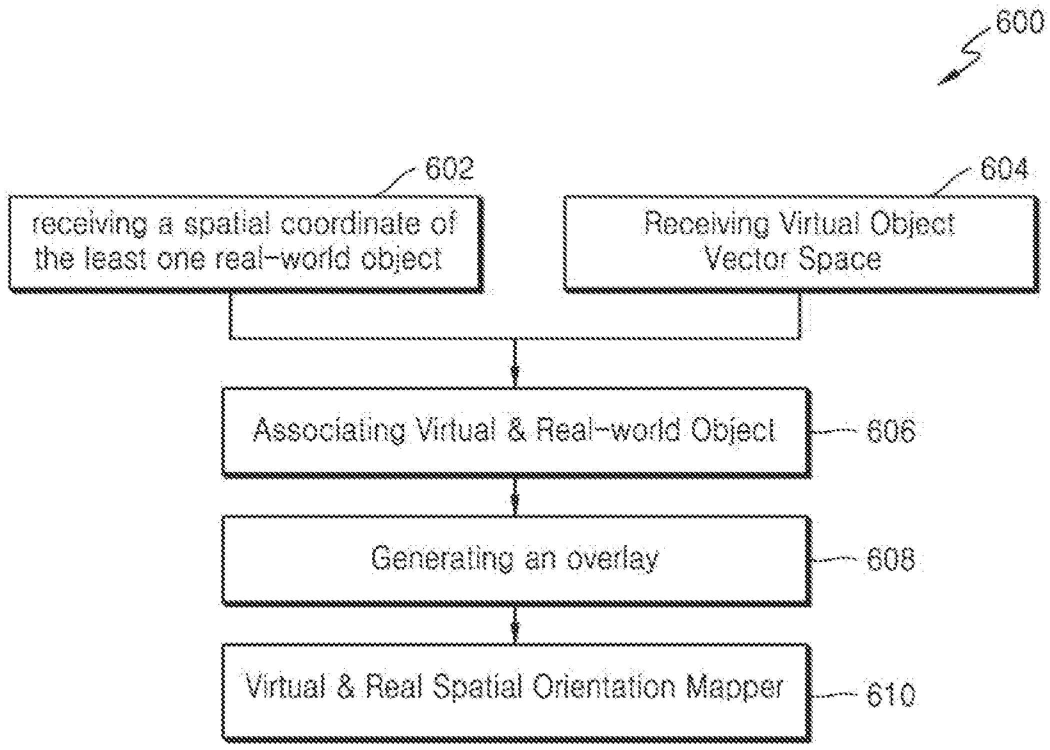
FIG. 6 illustrates a process flow of a method for generating an overlay of the real-world object within the ongoing virtual session, according to an embodiment.

FIG. 6 illustrates a process flow of a method 600 for generating the overlay 106*b* of the real-world object 106*a* within the ongoing virtual session 112, according to an embodiment of the disclosure.

At step 602, the method 600 may include receiving the spatial coordinate of the real-world object 106*a*. In an example the spatial coordinate is indicative of vertices of the real-world object 106*a* in the real world. The spatial coordinate is determined using the second signal received by the UWB radar 108 and upon determination of the real-world object 106*a*.

At step 604, the method 600 may include receiving a vector space for a virtual object. In an example, a characteristic feature of the ongoing virtual session 112 is identified such as a digital environment of the ongoing virtual session 112. In the example, the immersed user 102*a* selects the avatar 102*b* to be seated in a cafeteria within the ongoing virtual session 112. Thus, the characteristic feature of the cafeteria may typically include tables, chairs or other elements justifying the digital environment of the ongoing virtual session 112. The identified characteristic feature may form the virtual object(s) present within the ongoing virtual session 112. Thus, the vector space corresponding to such characteristic feature around the avatar 102*b* is determined.

At step 606, the method 600 may include associating the spatial coordinate with the characteristic feature.

At step 608, the method 600 may include generating the overlay 106*b* of the real-world object 106*a* within the ongoing virtual session 112 based on the association of the spatial coordinate with the characteristic feature.

At step 610, the method 600 may include determining the scaling and the position coordinates for the overlay 106*b* based on the real-world object 106*a*. In an example, the scaling is indicative of a proportional dimension of the overlay 106 in the ongoing virtual session 112 with reference to the real-world object 106*a*. The scaling may enable the synchronization of the real-world object 106*a* with the overlay 106 in the ongoing virtual session 112.

Figure 7:
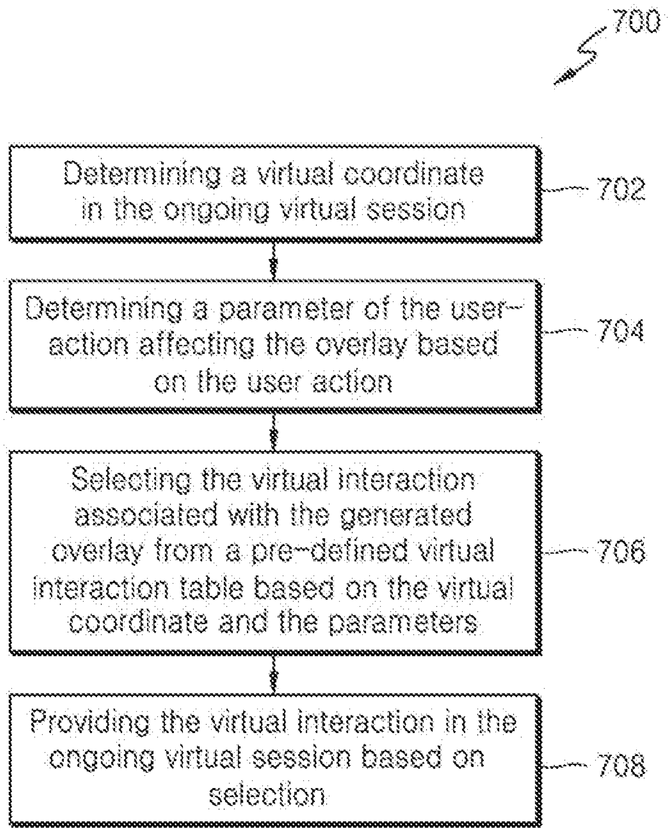
FIG. 7 illustrates a process flow of a method for providing the user with a virtual interaction associated with the generated overlay of the real-world object, according to an embodiment.

FIG. 7 illustrates a process flow of a method 700 for providing the immersed user 102*a* with the virtual interaction associated with the generated overlay 106*b* of the real-world object 106*a*, according to an embodiment of the disclosure.

At step 702, the method 700 may include determining a virtual coordinate in the ongoing virtual session 112. The virtual coordinate is indicative of the space in the ongoing virtual session 112 for the overlay 106*b* of the real-world object 106*a*. In an example, the virtual coordinates are determined based on the received spatial coordinates of the real-world object 106*a*.

At step 704, the method 700 may include receiving the action parameter corresponding to the predicted user action affecting the overlay 106*b*.

At step 706, the method 700 may include selecting the virtual interaction that may match the action parameter, and virtual coordinates with the real-world object 106*a* from the pre-defined virtual interaction table.

At step 708, the method 700 may include providing the selected virtual interaction in the ongoing virtual session 112 such that the virtual interaction resembles the predicted user action and hence assists the immersed user 102*a* to perform the interaction with the real-world object 106*a*.

Figure 8:
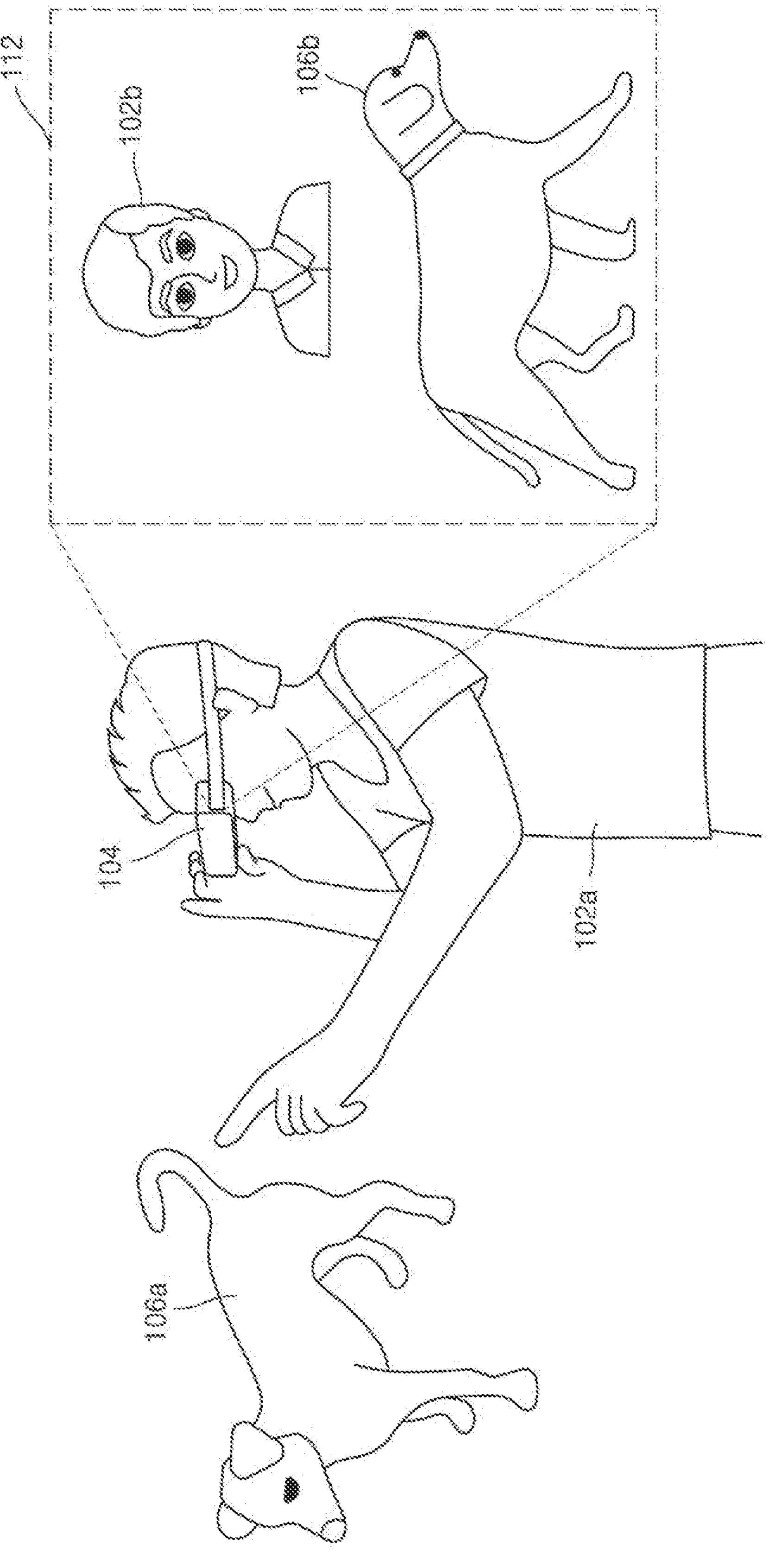
FIG. 8 illustrates a use-case for providing the interaction with the real-world object via the ongoing virtual session, according to an embodiment.

FIG. 8 illustrates a use-case for providing the interaction between the immersed user 102*a* and the real-world object 106*a* via the ongoing virtual session 112, according to an embodiment of the disclosure.

In an example, the real-world object 106*a* may be a pet dog which may approach the user 102*a*. While the user 102*a* may be immersed in the ongoing virtual session 112, the pet dog may be detected as the real-world object 106*a* near the immersed user 102*a*. Thus, in accordance with one or more embodiments, the overlay 106*b* shall be generated for the pet dog in the ongoing virtual session 112. Further, the user action predicted for the real-world object 106*a* being the pet dog may be cuddling or petting the pet dog. Thus, in accordance with the one or more embodiments, the one virtual interaction associated with the generated overlay 106*b* is provided to the immersed user 102*a*. The virtual interaction may resemble the predicted user action such as cuddling or petting the pet dog such that the virtual interaction assists the immersed user 102*a* in performing the predicted user action in the real world with ease.

Figure 9:
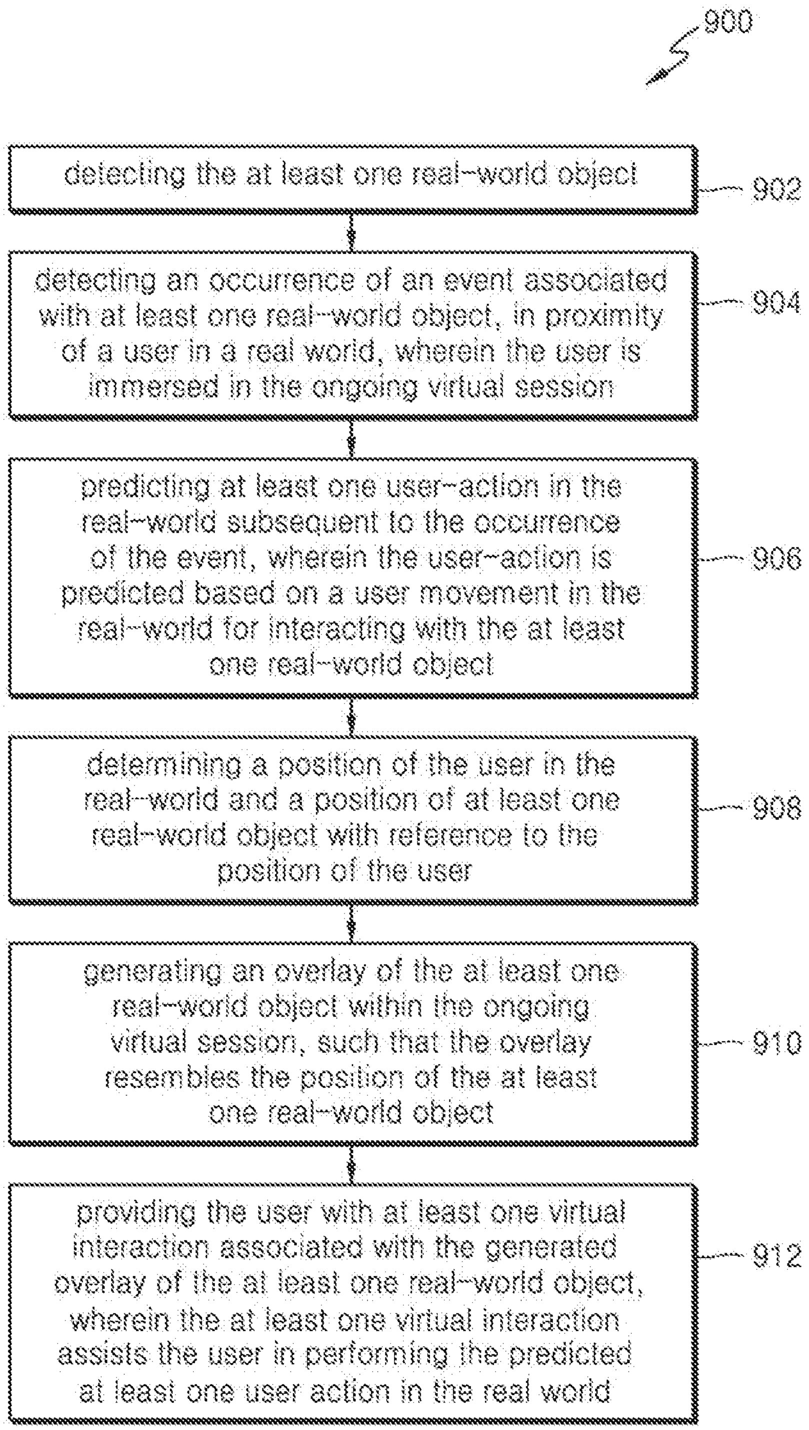
FIG. 9 illustrates a flow chart of a method for providing the interaction with the real-world object via the ongoing virtual session, according to an embodiment.

FIG. 9 illustrates a flow chart of a method 900 for providing the interaction with the real-world object 106*a* via the ongoing virtual session 112, according to an embodiment of the disclosure. The method 900 may be a computer-implemented method executed, for example, by the virtual session device 104 and the modules 206. For the sake of brevity, the constructional and operational features of the system 100 that are already explained in the description of FIGS. 1-8 are not explained in detail in the description of FIG. 9.

At step 902, the method 900 may include detecting the real-world object 106*a*.

At step 904, the method 900 may include detecting the occurrence of the event associated with the real-world object 106*a*, in proximity of the user 102*a* in the real world. The user 102*a* is immersed in the ongoing virtual session 112.

At step 906, the method 900 may include predicting the user action in the real world subsequent to the occurrence of the event. The user action is predicted based on the user movement in the real world for interacting with the real-world object 106*a*.

At step 908, the method 900 may include determining the position of the user 102*a* in the real world and the position of the real-world object 106*a* with reference to the position of the user 102*a*.

At step 910, the method 900 may include generating the overlay 106*b* of the real-world object 106*a* within the ongoing virtual session 112, such that the overlay 106*b* resembles the position of the real-world object 106*a*.

At step 912, the method 900 may include providing the user 102*a* with the virtual interaction associated with the generated overlay 106*b* of the real-world object 106*a*. The virtual interaction assists the user 102*a* in performing the predicted user action in the real world.

The one or more embodiments provide the following advantages:

a) The one or more embodiments assist the user to interact with the real-world object so that the User may not have to remove the HMD often. The interaction with the real-world object may be maintained while the user is immersed in the virtual session.

b) The one or more embodiments enable the user to be aware of the real-world events even while the user is immersed in a virtual session.

c) The one or more embodiments enable the user to accurately and easily able to interact with the real-world object while immersed in the virtual session.

d) The one or more embodiments increase users' productivity as the user may be able to participate in tasks both in the virtual session world and in the real world.

e) The one or more embodiments enhance the user immersion experience in the virtual session as the real world is integrated in the virtual session.

f) The one or more embodiments will help UWB to integrate with the virtual session of the user thus making the UWB sensors more useful and valuable for the user.

While specific language has been used to describe the disclosure, any limitations arising on account of the same are not intended. As would be apparent to a person in the art, various working modifications may be made to the method in order to implement the one or more embodiments.

The drawings and the forgoing description provide one or more example embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein.

According to an embodiment of the disclosure, the method may include detecting the at least one real-world object.

According to an embodiment of the disclosure, the method may include detecting an occurrence of an event associated with the at least one real-world object in proximity of an user in a real world.

According to an embodiment of the disclosure, the method may include predicting at least one user action in the real world subsequent to the occurrence of the event based on a movement of an user in the real world for interacting with the at least one real world object.

According to an embodiment of the disclosure, the method may include generating an overlay of the at least one real-world object within the ongoing virtual session based on a position of at least one real world object and a position of the user.

According to an embodiment of the disclosure, the method may include transmitting a first ultra-wide band (UWB) signal in the proximity of the user.

According to an embodiment of the disclosure, the method may include receiving a second UWB signal.

According to an embodiment of the disclosure, the method may include determining a variation in the second UWB signal.

According to an embodiment of the disclosure, the method may include detecting the at least one real-world object based on the variation.

According to an embodiment of the disclosure, the second UWB signal is reflected from the at least one real-world object by the first UWB signal.

According to an embodiment of the disclosure, the variation corresponds to a presence of at least one real-world object According to an embodiment of the disclosure, the method may include determining a shape of the at least one real-world object based on the determined variation.

According to an embodiment of the disclosure, the method may include determining at least one user parameter including at least one of a location, a time, or a previous activity.

According to an embodiment of the disclosure, the method may include detecting the at least one real-world object in the real world based on the shape and the at least one user parameter.

According to an embodiment of the disclosure, the method may include obtaining positional coordinates of the at least one real-world object based on the second UWB signal.

According to an embodiment of the disclosure, the method may include determining a spatial transformation in the at least one real-world object based on the positional coordinates.

According to an embodiment of the disclosure, the method may include detecting the occurrence of the event in the real world based on the spatial transformation.

According to an embodiment of the disclosure, the spatial transformation corresponds to at least one of a change in shape or a change in the positional coordinate.

According to an embodiment of the disclosure, the method may include obtaining a correlation between the detected event and the at least one real world object associated with the event.

According to an embodiment of the disclosure, the method may include predicting the at least one user action in the real world based on the correlation.

According to an embodiment of the disclosure, the method may include determining an action parameter indicating at least one of a duration of the at least one user action or a classification of the at least one user action based on the obtained correlation.

According to an embodiment of the disclosure, the method may include determining a privacy level of the at least one user action.

According to an embodiment of the disclosure, the privacy level corresponds to display restriction level of the at least one user action and the at least one real-world object for at least one other user sharing the same ongoing virtual session with the user.

According to an embodiment of the disclosure, the method may include obtaining spatial coordinates of the least one real world object corresponding to vertices of the at least one real-world object in the real world.

According to an embodiment of the disclosure, the method may include obtaining a characteristic feature of the ongoing virtual session corresponding to a digital environment of the ongoing virtual session.

According to an embodiment of the disclosure, the method may include associating the spatial coordinate with the characteristic feature.

According to an embodiment of the disclosure, the method may include generating the overlay of the at least one real-world object within the ongoing virtual session based on the association.

According to an embodiment of the disclosure, the method may include obtaining a scaling factor regarding size of the overlay of the at least one real world object and position coordinates of the at least one real world object.

According to an embodiment of the disclosure, the method may include generating the overlay of the at least one real-world object within the ongoing virtual session based on the scaling factor and position coordinates.

According to an embodiment of the disclosure, the method may include detecting at least one movement of the user in the real world for interacting with the at least one real world object.

According to an embodiment of the disclosure, the method may include generating, at least one virtual interaction in the ongoing virtual session based on the detected at least one movement of the user.

According to an embodiment of the disclosure, the method may include determining an user context corresponding to at least one of a user current location, a time, or an environment in the real world, wherein a user is in the ongoing virtual session.

According to an embodiment of the disclosure, the method may include generating at least one virtual interaction in the ongoing virtual session based on the detected at least one movement of the user and the user context.

According to an embodiment of the disclosure, a virtual reality device may include at least one memory configured to store instructions and at least one processor configured to execute the instructions.

According to an embodiment of the disclosure, at least one processor is configured to detect the at least one real-world object.

According to an embodiment of the disclosure, at least one processor is configured to detect an occurrence of an event associated with the at least one real-world object in proximity of an user in a real world.

According to an embodiment of the disclosure, at least one processor is configured to predict at least one user action in the real-world subsequent to the occurrence of the event based on a user movement in the real world for interacting with the at least one real-world object.

According to an embodiment of the disclosure, at least one processor is configured to generate an overlay of the at least one real-world object within the ongoing virtual session based on a position of at least one real world object and a position of the user.

According to an embodiment of the disclosure, a virtual reality device may include a transceiver coupled with the at least one processor.

According to an embodiment of the disclosure, at least one processor is configured to transmit a first ultra-wide band (UWB) signal in the proximity of the user.

According to an embodiment of the disclosure, at least one processor is configured to receive a second UWB signal.

According to an embodiment of the disclosure, at least one processor is configured to determine a variation in the second UWB signal.

According to an embodiment of the disclosure, at least one processor is configured to detect the at least one real-world object based on the variation.

According to an embodiment of the disclosure, the second UWB signal is reflected from the at least one real-world object by the first UWB signal.

According to an embodiment of the disclosure, the variation corresponds to a presence of at least one real-world object.

According to an embodiment of the disclosure, at least one processor is configured to determine a shape of the at least one real-world object based on the determined variation.

According to an embodiment of the disclosure, at least one processor is configured to determine at least one user parameter including at least one of a location, a time, or a previous activity.

According to an embodiment of the disclosure, at least one processor is configured to detect the at least one real-world object in the real world based on the shape and the at least one user parameter.

According to an embodiment of the disclosure, at least one processor is configured to determine positional coordinates of the at least one real-world object based on the second UWB signal.

According to an embodiment of the disclosure, at least one processor is configured to determine a spatial transformation in the at least one real-world object based on the positional coordinate.

According to an embodiment of the disclosure, at least one processor is configured to detect the occurrence of the event in the real world based on the spatial transformation.

According to an embodiment of the disclosure, the spatial transformation corresponds to at least one of a change in shape or a change in the positional coordinate.

According to an embodiment of the disclosure, at least one processor is configured to obtain a correlation between the detected event and the at least one real-world object associated with the event.

According to an embodiment of the disclosure, at least one processor is configured to predict the at least one user action in the real world based on the correlation.

According to an embodiment of the disclosure, at least one processor is configured to determine an action parameter indicating at least one of a duration of the at least one user action or a classification of the at least one user action based on the obtained correlation.

According to an embodiment of the disclosure, at least one processor is configured to determine a privacy level of the at least one user action, wherein the privacy level corresponds to a display restriction level of the at least one user action and the at least one real-world object for at least one other user sharing the same ongoing virtual session with the user.

According to an embodiment of the disclosure, at least one processor is configured to obtain spatial coordinates of the least one real-world object corresponding to vertices of the at least one real-world object in the real world.

According to an embodiment of the disclosure, at least one processor is configured to obtain a characteristic feature of the ongoing virtual session, corresponding to a digital environment of the ongoing virtual session.

According to an embodiment of the disclosure, at least one processor is configured to associate the spatial coordinate with the characteristic feature.

According to an embodiment of the disclosure, at least one processor is configured to generate the overlay of the at least one real-world object within the ongoing virtual session based on the association.

According to an embodiment of the disclosure, at least one processor is configured to obtain a scaling factor regarding size of the overlay of the at least one real world object and position coordinates of the at least one real world object.

According to an embodiment of the disclosure, at least one processor is configured to generate the overlay of the at least one real-world object within the ongoing virtual session based on the scaling factor and position coordinates.

According to an embodiment of the disclosure, at least one processor is configured to detect at least one movement of the user in the real world for interacting with the at least one real world object.

According to an embodiment of the disclosure, at least one processor is configured to generate at least one virtual interaction in the ongoing virtual session based on the detected at least one movement of the user According to an embodiment of the disclosure, at least one processor is configured to determine an user context corresponding to at least one of a user current location, a time, an environment in the real world, wherein a user is immersed in the ongoing virtual session.

According to an embodiment of the disclosure, at least one processor is configured to generate at least one virtual interaction in the ongoing virtual session based on the detected at least one movement of the user and determined the user context.

What is claimed is:

1. A method of a virtual reality device, the method comprising:

detecting at least one real-world object;

detecting an occurrence of an event associated with the at least one real-world object in proximity of a user in a real world;

determining a correlation between the detected event and the at least one real-world object associated with the event;

based on the determined correlation, determining an action parameter including at least one of a duration of at least one user action indicating an amount of time that the user spends on interacting with the at least one real-world object or a classification of the at least one user action indicating an interest level and an importance of the at least one real-world object;

predicting the at least one user action in the real world subsequent to the occurrence of the event based on a movement of the user in the real world for interacting with the at least one real-world object and the determined action parameter; and generating an overlay of the at least one real-world object within an ongoing virtual session based on a position of at least one real-world object and a position of the user.

2. The method of claim 1, wherein the detecting the at least one real-world object comprises:

transmitting a first ultra-wide band (UWB) signal in the proximity of the user;

receiving a second UWB signal;

determining a variation in the second UWB signal; and detecting the at least one real-world object based on the variation, wherein the second UWB signal is reflected from the at least one real-world object by the first UWB signal, and wherein the variation corresponds to a presence of at least one real-world object.

3. The method of claim 2, wherein the detecting the at least one real-world object further comprises:

determining a shape of the at least one real-world object based on the determined variation;

determining at least one user parameter including at least one of a location, a time, or a previous activity; and detecting the at least one real-world object in the real world based on the shape and the at least one user parameter.

4. The method of claim 2, wherein the detecting the occurrence of the event comprises:

obtaining positional coordinates of the at least one real-world object based on the second UWB signal;

determining a spatial transformation in the at least one real-world object based on the positional coordinates; and detecting the occurrence of the event in the real world based on the spatial transformation, wherein the spatial transformation corresponds to at least one of a change in shape or a change in the positional coordinates.

5. The method of claim 1, wherein the predicting of the at least one user action further comprises:

determining a privacy level of the at least one user action, wherein the privacy level corresponds to display restriction level of the at least one user action and the at least one real-world object for at least one other user sharing the same ongoing virtual session with the user.

6. The method of claim 1, wherein the generating the overlay of the at least one real-world object within the ongoing virtual session comprises:

obtaining spatial coordinates of the at least one real-world object corresponding to vertices of the at least one real-world object in the real world;

obtaining a characteristic feature of the ongoing virtual session corresponding to a digital environment of the ongoing virtual session;

associating the spatial coordinates with the characteristic feature; and generating the overlay of the at least one real-world object within the ongoing virtual session based on the association.

7. The method of claim 1, wherein the generating the overlay of the at least one real-world object within the ongoing virtual session comprises obtaining a scaling factor regarding size of the overlay of the at least one real-world object and position coordinates of the at least one real-world object; and generating the overlay of the at least one real-world object within the ongoing virtual session based on the scaling factor and the position coordinates.

8. The method of claim 1, further comprising:

detecting at least one movement of the user in the real world for interacting with the at least one real-world object; and generating at least one virtual interaction in the ongoing virtual session based on the detected at least one movement of the user.

9. The method of claim 8, comprising:

determining a user context corresponding to at least one of a user current location, a time, or an environment in the real world, wherein a user is in the ongoing virtual session; and generating the at least one virtual interaction in the ongoing virtual session based on the detected at least one movement of the user and the user context.

10. A virtual reality device comprising:

at least one memory configured to store instructions;

at least one processor configured to execute the instructions to:

detect at least one real-world object, detect an occurrence of an event associated with the at least one real-world object in proximity of a user in a real world, determine a correlation between the detected event and the at least one real-world object associated with the event, based on the determined correlation, determine an action parameter including at least one of a duration of at least one user action indicating an amount of time that the user spends on interacting with the at least one real-world object or a classification of the at least one user action indicating an interest level and an importance of the at least one real-world object, predict the at least one user action in the real world subsequent to the occurrence of the event based on a user movement in the real world for interacting with the at least one real-world object and the determined action parameter, and generate an overlay of the at least one real-world object within an ongoing virtual session based on a position of at least one real-world object and a position of the user.

11. The virtual reality device of claim 10, further comprising:

a transceiver coupled with the at least one processor, wherein the at least one processor is further configured to execute the instructions to:

transmit a first ultra-wide band (UWB) signal in the proximity of the user, receive a second UWB signal, determine a variation in the second UWB signal, and detect the at least one real-world object based on the variation, wherein the second UWB signal is reflected from the at least one real-world object by the first UWB signal, and wherein the variation corresponds to a presence of at least one real-world object.

12. The virtual reality device of claim 11, wherein the at least one processor is further configured to execute the instructions to:

determine a shape of the at least one real-world object based on the determined variation, determine at least one user parameter including at least one of a location, a time, or a previous activity, and detect the at least one real-world object in the real world based on the shape and the at least one user parameter.

13. The virtual reality device of claim 11, wherein the at least one processor is further configured to execute the instructions to:

determine positional coordinates of the at least one real-world object based on the second UWB signal, determine a spatial transformation in the at least one real-world object based on the positional coordinates, and detect the occurrence of the event in the real world based on the spatial transformation, and wherein the spatial transformation corresponds to at least one of a change in shape or a change in the positional coordinates.

14. The virtual reality device of claim 10, wherein the at least one processor is further configured to execute the instructions to:

determine a privacy level of the at least one user action, wherein the privacy level corresponds to a display restriction level of the at least one user action and the at least one real-world object for at least one other user sharing the same ongoing virtual session with the user.

15. The virtual reality device of claim 10, wherein the at least one processor is further configured to execute the instructions to:

obtain spatial coordinates of the at least one real-world object corresponding to vertices of the at least one real-world object in the real world, obtain a characteristic feature of the ongoing virtual session, corresponding to a digital environment of the ongoing virtual session, associate the spatial coordinates with the characteristic feature, and generate the overlay of the at least one real-world object within the ongoing virtual session based on the association.

16. The virtual reality device of claim 10, wherein the at least one processor is further configured to execute the instructions to:

obtain a scaling factor regarding size of the overlay of the at least one real-world object and position coordinates of the at least one real-world object, and generate the overlay of the at least one real-world object within the ongoing virtual session based on the scaling factor and the position coordinates.

17. The virtual reality device of claim 10, wherein the at least one processor is further configured to execute the instructions to:

detect at least one movement of the user in the real world for interacting with the at least one real-world object, and generate at least one virtual interaction in the ongoing virtual session based on the detected at least one movement of the user.

18. The virtual reality device of claim 17, wherein the at least one processor is further configured to execute the instructions to:

determine a user context corresponding to at least one of a user current location, a time, an environment in the real world, wherein a user is immersed in the ongoing virtual session, and generate the at least one virtual interaction in the ongoing virtual session based on the detected at least one movement of the user and determined the user context.

* * * * *